(12) United States Patent
Conrad et al.

(10) Patent No.: US 10,179,961 B2
(45) Date of Patent: Jan. 15, 2019

(54) EMBROIDERY PRODUCTION MONITORING SYSTEM

(71) Applicant: Conrad Industries, Inc., Weaverville, NC (US)

(72) Inventors: Bernhard Conrad, Weaverville, NC (US); Gilbert Carlson, Asheville, NC (US)

(73) Assignee: Conrad Industries, Inc., Weaverville, NC (US)

( * ) Notice: Subject to any disclaimer, the term of this patent is extended or adjusted under 35 U.S.C. 154(b) by 295 days.

(21) Appl. No.: 15/176,798

(22) Filed: Jun. 8, 2016

(65) Prior Publication Data

US 2016/0355964 A1 Dec. 8, 2016

Related U.S. Application Data

(60) Provisional application No. 62/172,571, filed on Jun. 8, 2015.

(51) Int. Cl.
*D05B 81/00* (2006.01)
*D05B 19/08* (2006.01)
*G05B 15/02* (2006.01)

(52) U.S. Cl.
CPC ............. *D05B 19/08* (2013.01); *D05B 81/00* (2013.01); *G05B 15/02* (2013.01)

(58) Field of Classification Search
CPC .. B06G 2600/124; D01G 31/00; D01H 13/14; D05B 19/003; D05B 19/02; D05B 19/12
See application file for complete search history.

(56) References Cited

U.S. PATENT DOCUMENTS

| 4,570,560 A | 2/1986 | Hubele |
| 4,936,233 A | 6/1990 | Tajima et al. |
| 4,987,842 A | 1/1991 | Nakamura et al. |
| 5,074,229 A | 12/1991 | Sasako et al. |
| 5,078,067 A | 1/1992 | Nakashima |
| 5,295,451 A | 3/1994 | Takenoya |
| 5,782,192 A | 7/1998 | Kear et al. |

(Continued)

*Primary Examiner* — Ponnoreay Pich
(74) *Attorney, Agent, or Firm* — The Van Winkle Law Firm; William G. Heedy; David M. Carter (57) ABSTRACT

An embroidery production monitoring system for use in combination with one or more embroidery machines includes at least one mimic light component including a light component, an enclosure flange that is sized and structured for attachment over the machine bulb and lens of the one or more embroidery machines, and a light sensor that is structured and disposed for detecting light emitted by the machine bulb; a plurality of sensors being structured and disposed for collecting performance data of the one or more embroidery machines and transmitting the performance data to the at least one mimic light component and a control box; the control box including a visual display interface, and the control box being provided for receiving the performance data and displaying a plurality of performance measurements on the visual display interface; and wherein the mimic light component is automatically actuated by delivery of a signal from the light sensor to the light component to thereby illuminate the light component.

14 Claims, 6 Drawing Sheets

(56) References Cited

U.S. PATENT DOCUMENTS

| | | | | |
|---|---|---|---|---|
| 5,860,715 | A * | 1/1999 | Lohde | A47B 45/00 174/50 |
| 9,834,876 | B2 * | 12/2017 | Kongo | D05B 19/02 |
| 2012/0235600 | A1 * | 9/2012 | Simonian | H05B 33/086 315/312 |
| 2014/0063837 | A1 * | 3/2014 | Rowlette, Jr. | G02B 6/0008 362/555 |
| 2015/0045939 | A1 * | 2/2015 | Kongo | D05B 19/12 700/143 |

* cited by examiner

FIG. 5

# EMBROIDERY PRODUCTION MONITORING SYSTEM

This application is based on and claims priority to provisional patent application No. 62/172,571 filed on Jun. 8, 2015.

BACKGROUND OF THE INVENTION

Field of the Invention

The invention relates to programmable embroidery machines, including singe-head and multi-head equipment, and, more particularly, to an embroidery production monitoring system for collecting and analyzing a variety of data inputs relating to embroidery machine efficiency.

Discussion of the Related Art

A number of different types of embroidery machines are widely used and the specific type of embroidery equipment is generally selected based on the anticipated scale of production. Embroidery equipment ranges from single-head embroidery machines that are suited for commercial use to multi-head embroidery machines that are suited for use in large scale industrial settings.

There are many instances during operation of embroidery machinery—particularly industrial multi-head embroidery machinery—wherein one or more individual components of the machinery malfunctions. Moreover, personnel issues, material issues and/or maintenance issues may require supervision, maintenance or management. One common instance wherein an individual component of embroidery equipment would require maintenance occurs when the embroidery thread breaks on one or more heads. In any situation wherein the embroidery machinery malfunctions, the malfunction must first be detected before the necessary maintenance can be performed to correct the malfunction. Therefore, it is advantageous for the embroidery equipment to be constantly monitored during operation for detecting problematic conditions in order to ensure optimal production and process management.

While there are presently available embroidery machinery monitoring systems, these systems require purchase of a specific class of embroidery machinery or mounting a monitoring device directly into or onto the embroidery machinery electronics and architecture. For example, U.S. Pat. No. 4,987,842 to Nakamura et al. discloses a detector for use on a sewing machine that requires mounting a photoelectric detector plate onto a coupling fixed to an arm shaft of a sewing machine.

In light of the problems associated with presently available embroidery machinery monitoring systems, there exists a need for a universal system for monitoring the production and performance of embroidery machines having single-head or multi-head configurations, and which does not require manipulation of the machinery architecture or electronic connection to or invasion of the embroidery machine for installation.

SUMMARY OF THE INVENTION

The present invention is directed to an embroidery production monitoring system that is adaptable for use in combination with standard embroidery machinery. In one embodiment, the monitoring system is adapted for use in combination with single-head and multi-head embroidery machinery. The monitoring system collects and interprets a constant stream of production data relative to all inputs (e.g., production interruptions caused by machine malfunctions, personnel issues, and material and maintenance issues) to provide a user with information relating to the performance of the interconnected embroidery machinery. In one embodiment, the performance data collected and interpreted by the monitoring system includes, but is not limited to: actions and interactions of machinery operators, supervisors, and maintenance personnel; production benchmarking performance at any given time or within any given span of time; temperature levels; humidity levels; stitch counts; trim counts; individual needle selection; thread break detection; and comparison of actual performance to expected performance. The monitoring system includes a plurality of sensors for collecting the performance data. In one embodiment, one or more of the plurality of sensors are optical sensors. Other embodiments of sensors include, but are not limited to, capacitive, inductive, and variable resistance sensors. The data is transmitted (e.g., wired or wireless transmission) to one or more computers and displayed to a user via one or more indicator lights, one or more mimic lights, and a control box in connection with a user interface having a visual display.

In accordance with one form of this invention, there is provided an embroidery production monitoring system for use in combination with one or more embroidery machines, and the embroidery production monitoring system including at least one mimic light component including a light component, an enclosure flange that is sized and structured for attachment over the machine bulb and lens of the one or more embroidery machines, and a light sensor that is structured and disposed for detecting light emitted by the machine bulb; a plurality of sensors being structured and disposed for collecting performance data of the one or more embroidery machines and transmitting the performance data to the at least one mimic light component and a control box; the control box including a visual display interface, and the control box being provided for receiving the performance data and displaying a plurality of performance measurements on the visual display interface; and wherein the mimic light component is automatically actuated by delivery of a signal from the light sensor to the light component to thereby illuminate the light component.

In accordance with another form of this invention, there is provided an embroidery production monitoring system for use in combination with one or more embroidery machines, and the embroidery production monitoring system including at least one mimic light component including a light component and a light sensor being sized and configured for mounting adjacent to the machine bulb and lens of the one or more embroidery machines, and the light sensor being structured and disposed for detecting light emitted by the machine bulb; a plurality of sensors being structured and disposed for collecting performance data of the one or more embroidery machines and transmitting the performance data to the at least one mimic light component and a control box; the control box including a visual display interface, and the control box being provided for receiving the performance data and displaying a plurality of performance measurements on the visual display interface; and wherein the mimic light component is automatically actuated by delivery of a signal from the light sensor to the light component to thereby illuminate the light component.

BRIEF DESCRIPTION OF THE DRAWINGS

For a fuller understanding of the nature of the present invention, reference should be made to the following detailed description, taken in conjunction with the accompanying drawings in which.

Like reference numerals refer to like reference parts throughout the several views of the drawings.

DETAILED DESCRIPTION OF THE PREFERRED EMBODIMENTS

Referring to the several views of the drawings, the embroidering production monitoring system of the present invention is configured for superficial attachment to an embroidery machine 100 as shown and is generally indicated as 10.

Figure 1:
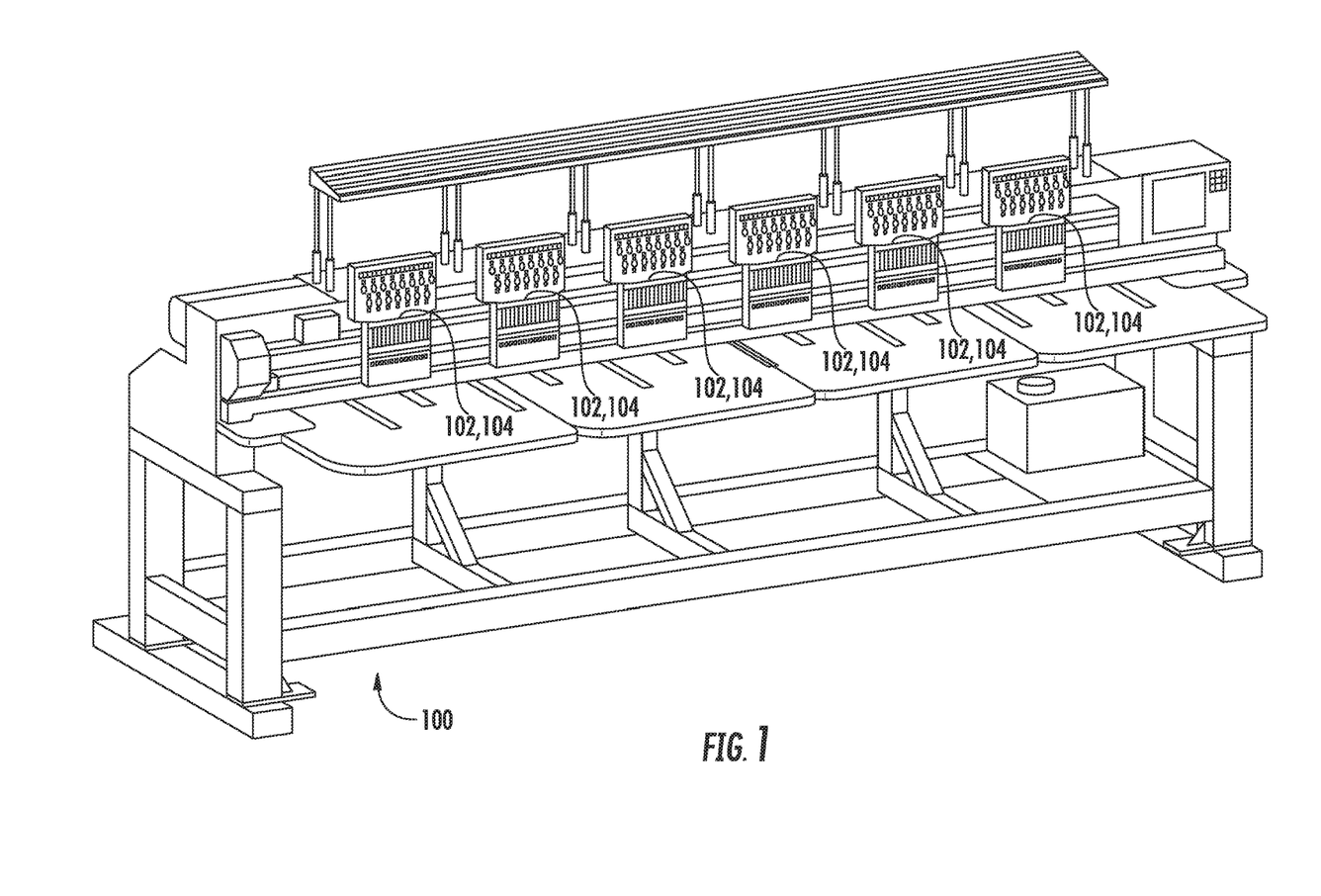
FIG. 1 is a perspective view of a multi-head embroidery machine.
Figure 2:
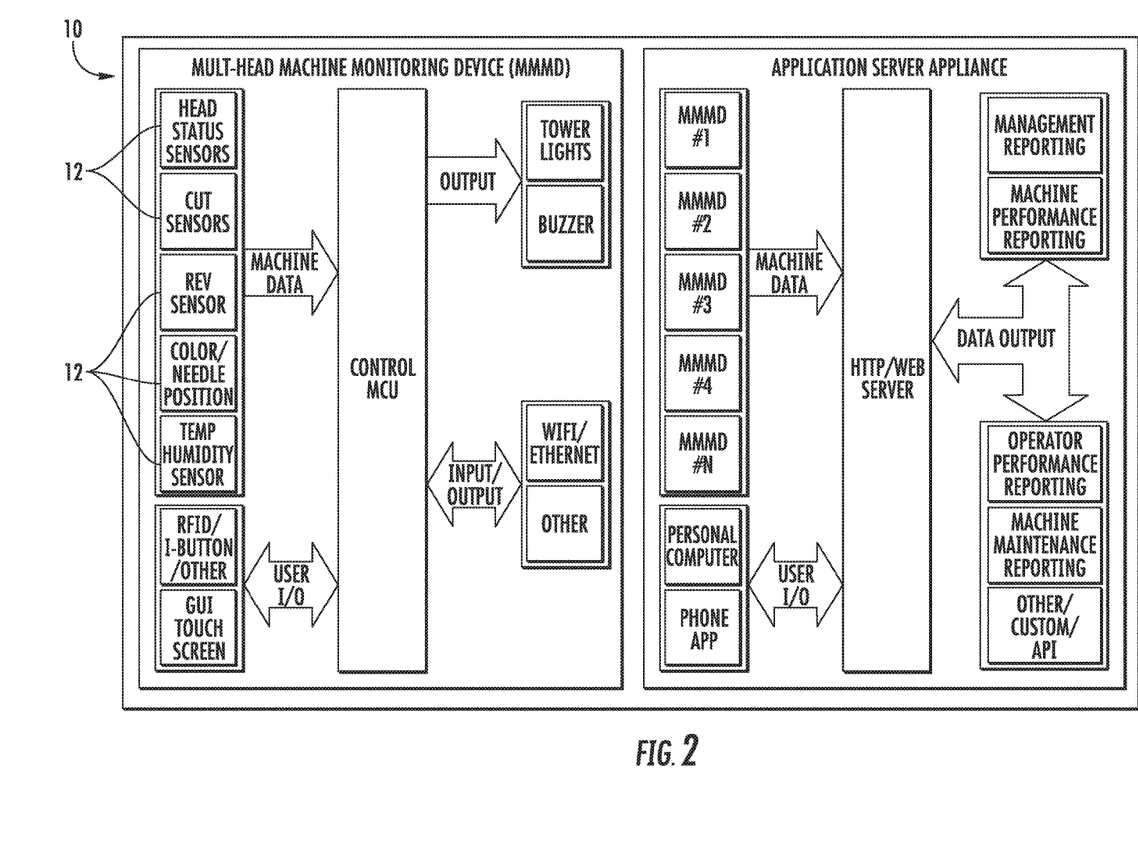
FIG. 2 is a schematic diagram illustrating the concurrent operations of data output of the production monitoring device of the present invention.

Referring initially to FIGS. 1 and 2, the embroidery production monitoring system 10 is adapted for use in combination with one or more embroidery machines 100. In one embodiment, the monitoring system 10 is adapted for use in combination with single-head and/or multi-head embroidery machinery 100. The monitoring system 10 includes a plurality of sensors 12 for collecting performance data related to the embroidery machinery 100 production. In one embodiment, the performance data collected and interpreted by the monitoring system 10 includes but is not limited to: the actions and interactions of machinery operators; production benchmarking performance at any given time or within any given span of time, with each event being timestamped; temperature levels; humidity levels; stitch counts; trim counts; individual needle selection; and thread break detection. The data is transmitted from the sensors 12 to one or more computers and displayed to a user via one or more indicator lights, including directly or remotely mounted mimic lights 16 and light towers 17, and/or monitors, such as a control box 18 having a visual display interface 19. The data may be transmitted wirelessly or via a wired connection. In one embodiment, the monitoring system 10 collects data related to user usage (e.g. mechanics; supervisors) for tracking human interaction and accountability, wherein users are provided with a personal identification device (e.g., common proximity card, button, key, etc.) or other identifying logon tool that is required for signing into the monitoring system 10.

The sensors 12 used to collect data related to production performance include one or more sensors, including but not limited to: optical light sensors, temperature sensors, proximity sensors, and humidity level sensors.

Importantly, the monitoring system 10 does not require interaction or connection with the machine architecture of the one or more embroidery machines 100. Specifically, there are no wired connections or modifications made to the one or more embroidery machines 100 or its electronic control system, thereby permitting use of the monitoring system 10 with a variety of different embroidery machines and without invading the structure of the different embroidery machines.

Figure 3:
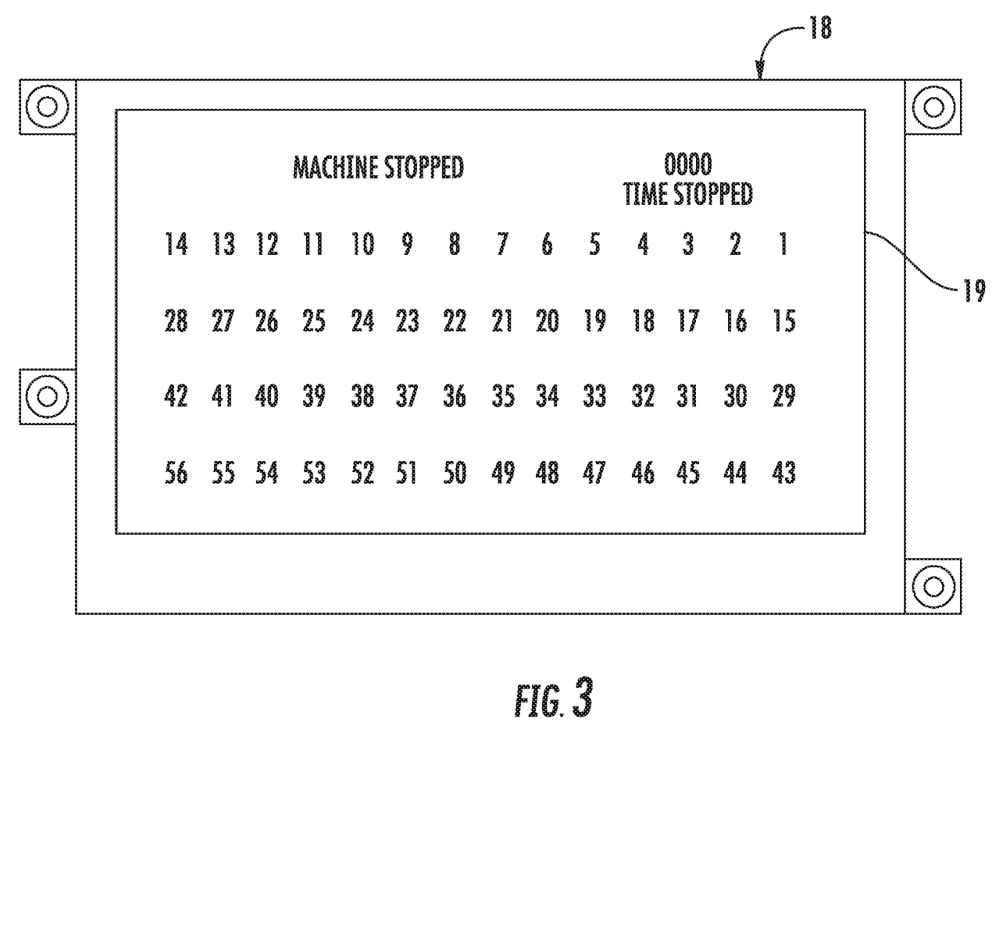
FIG. 3 is a front elevational view of a control box having a user interface according to one embodiment of the production monitoring device of the present invention.
Figure 4A:
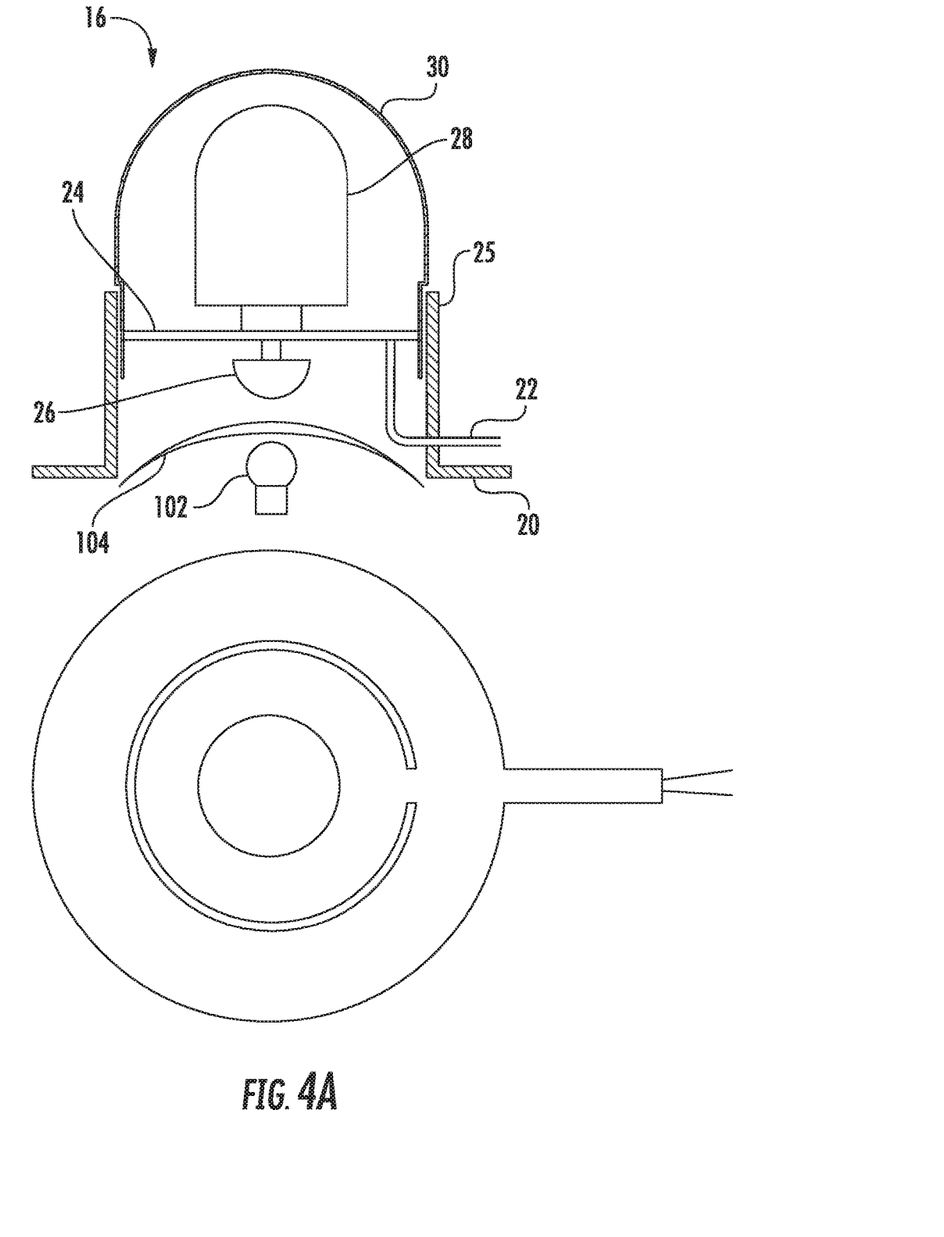
FIG. 4A is a side elevational view of a mimic light according to one embodiment for use in combination with the production monitoring system of the present invention.

Referring to FIG. 3, the control box 18 is shown. The visual display interface 19 on the control box 18 displays information related to current multi-head and/or single-head machine performance, statuses, and trend information. More specifically, different embodiments of the invention may keep track and display to a user the following characteristics, among others, in both real time and over a selected period of time: interruptions by frequency, time per occurrence, total number, total time, operator, machine, shift, atmospheric conditions, as well as any other possible inputs and correlations. In one embodiment, the visual display interface 19 is a touchscreen interface configured for user navigation. In addition to the control box 18, further embodiments of the monitoring system 10 may include additional mediums for displaying and otherwise providing information related to machine performance, such as, but not limited to: mountable monitors (e.g., LCD monitors), message alerts sent to portable electronic devices (e.g., text messages), and secured accessibility via internet. A non-limiting list of data collected and subsequently displayed to a user is provided below:

Stitch Counts, Related to Time
Total Stitches
Stitches Per Minute—instantaneous and average
Run Time vs. Stop Time
Trim Counts, Related to Time
Shows time relationship of stitch errors and trims
Color (Needle Position) Selection
Shows color status relationship of thread in use to errors
ID Cards
Personnel logged on and off times—operator, supervisor, mechanic, and others
Possible means of inputting order ID
Touch Screen
Possible means of inputting order ID
Communication of operator input and operational needs
Supervisor input
Mechanic input
Thread Break Detection
Most common detection of machine error
Shows which head/s have broken thread Referring to FIG. 4A, a mimic light 16 is sized and configured for surrounding a machine bulb 102 of a thread break indicator light (also shown in FIG. 1) and the associated machine lens 104, where applicable. The mimic light 16 serves to prominently reproduce the luminosity of the machine bulb 102, which can be difficult to see from a distance and multiple angles is often recessed within the frame of the embroidery machine 100. Each mimic light 16 includes an enclosure flange 20 that is structured for semi-permanent attachment over the machine bulb 102 and lens 104 and is sized to permit passage therethrough of one or more signal wires 22 in connection with a circuit board 24 and circuit enclosure 25 secured thereto. A light sensor 26 is structured and disposed for detecting light emitted by the machine bulb 102 and delivering a signal to a secondary light 28, such as a light emitting diode (LED), to thereby illuminate the secondary light 28. The enclosure flange 20 is made from a material sufficient for blocking ambient light from passing therethrough to ensure the light sensor 26 detects only light emitted by the machine bulb 102. A transparent lens 30 surrounds the secondary light 28 for protecting the secondary light 28. In one embodiment, the secondary light 28 is positionable at a location away from the light sensor 26 in the event that such a location would be more widely visible by an operator or supervisor.

Figure 4B:
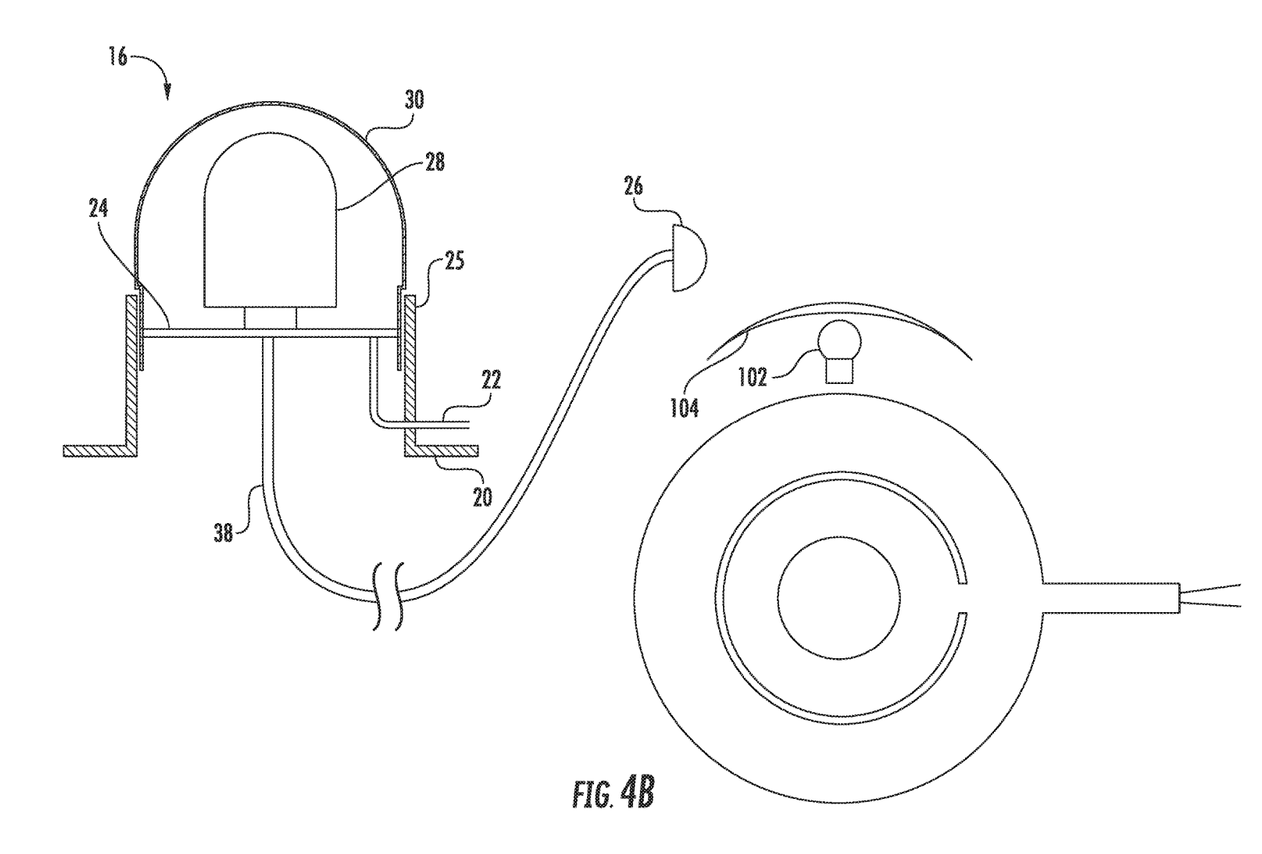
FIG. 4B is a side elevational view of a mimic light according to one embodiment for use in combination with the production monitoring system of the present invention.

Referring to FIG. 4B, an another embodiment of the mimic light 16 is shown wherein light sensor 26 is removed from the mimic light component 16 and adhered adjacent to the machine bulb 102. The light sensor 26 is now connected to the mimic light component 16 via wired connection. Lastly, the mimic light component 16 is mounted in a location selected by the user.

Figure 5:
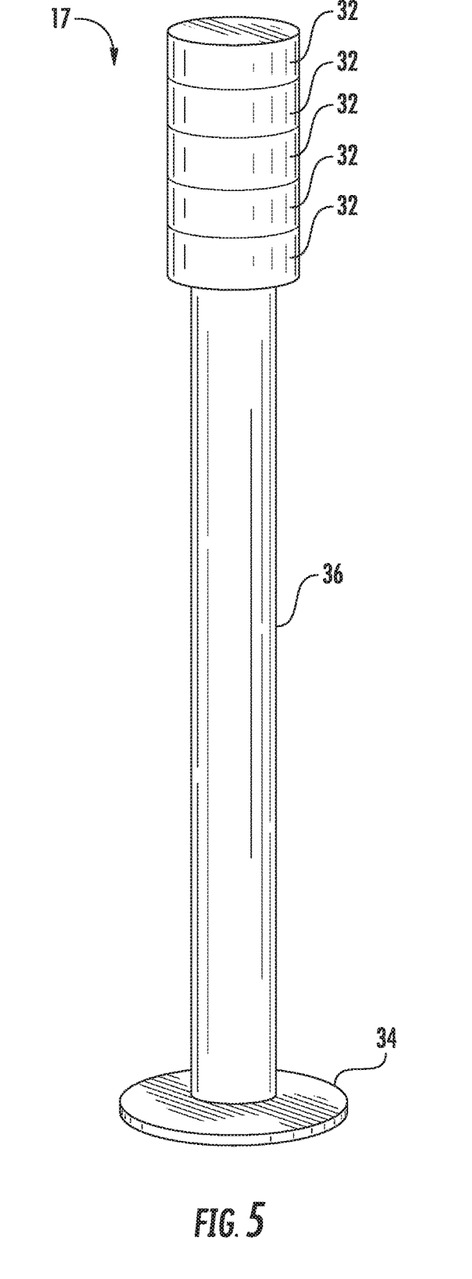
FIG. 5 is a perspective view of a light tower.

Referring to FIG. 5, the light tower 17 is shown. In a preferred embodiment, the light tower 17 is positionable adjacent to a specific single-head or multi-head embroidery machine 100 such that the light tower 17 is readily identifiable with a specific embroidery machine 100. Each light tower 17 includes a plurality of lights 32, wherein each individual light may be configured to display in a distinct color and/or pattern, wherein each distinct color relates to a specific event and/or status of the embroidery machine (e.g., broken thread indicator and all manner of machine stoppages and slowdowns). In one embodiment, the light tower 17 includes a support base 34 and an elongated member 36 having the plurality of lights 32 secured thereto.

The monitoring system 10, as described, provides a method for continuously tracking performance data in order to provide a complete data set. A standard single-head or multi-head embroidery machine 100 slows down as the stitch length increases, while manufacturers specify only the top speed of their machine rather than a range of speeds based on stitch length. Therefore, for example, while a customer might know that the shortest stitch will run at 1,200 RPM, he or she would not know the RPM for a 6 mm, 7.3 mm or 8.2 mm stitch. The monitoring system 10 provides such values for precise measurements, along with trim times, color change times and other machine-determined times, thereby permitting the customer to make decisions (e.g., which machine is most efficient for a particular pattern) with a full knowledge base. A preferred embodiment of the monitoring system 10 includes the information being reported in a uniform manner regardless of make, model, or age of the embroidery machine.

While the present invention has been shown and described in accordance with several preferred and practical embodiments, it is recognized that departures from the instant disclosure are contemplated within the spirit and scope of the present invention.

What is claimed is:

1. An embroidery production monitoring system for use in combination with one or more embroidery machines, and said embroidery production monitoring system comprising:
   at least one mimic light component including a light component, an enclosure flange that is sized and structured for attachment over the machine bulb and lens of the one or more embroidery machines, and a light sensor that is structured and disposed for detecting light emitted by a machine bulb on the one or more embroidery machines;
   a plurality of sensors being structured and disposed for collecting performance data of the one or more embroidery machines and transmitting the performance data to said at least one mimic light component and a control box;
   said control box including a visual display interface, and said control box being provided for receiving the performance data and displaying a plurality of performance measurements on said visual display interface; and
   wherein said at least one mimic light component is automatically actuated by delivery of a signal from said light sensor to said light component to thereby illuminate the light component.

2. The embroidery production monitoring system as recited in claim 1 wherein said plurality of sensors includes at least one optical light sensor.

3. The embroidery production monitoring system as recited in claim 1 wherein said plurality of sensors includes at least one temperature sensor.

4. The embroidery production monitoring system as recited in claim 1 wherein said plurality of sensors includes at least one proximity sensor.

5. The embroidery production monitoring system as recited in claim 1 wherein said plurality of sensors includes at least one humidity level sensor.

6. The embroidery production monitoring system as recited in claim 1 wherein said plurality of performance measurements includes interruptions by frequency, time per interruption occurrence, total number of interruptions, machine operator identification, machine identification, shift identification, and atmospheric conditions.

7. The embroidery production monitoring system as recited in claim 1 wherein said light component is a light emitting diode.

8. An embroidery production monitoring system for use in combination with one or more embroidery machines, and said embroidery production monitoring system comprising:
   at least one mimic light component including a light component and a light sensor being sized and configured for mounting adjacent to the machine bulb and lens of the one or more embroidery machines, and said light sensor being structured and disposed for detecting light emitted by a machine bulb on the one or more embroidery machines;
   a plurality of sensors being structured and disposed for collecting performance data of the one or more embroidery machines and transmitting the performance data to said at least one mimic light component and a control box;
   said control box including a visual display interface, and said control box being provided for receiving the performance data and displaying a plurality of performance measurements on said visual display interface; and
   wherein said at least one mimic light component is automatically actuated by delivery of a signal from said light sensor to said light component to thereby illuminate the light component.

9. The embroidery production monitoring system as recited in claim 8 wherein said plurality of sensors includes at least one optical light sensor.

10. The embroidery production monitoring system as recited in claim 8 wherein said plurality of sensors includes at least one temperature sensor.

11. The embroidery production monitoring system as recited in claim 8 wherein said plurality of sensors includes at least one proximity sensor.

12. The embroidery production monitoring system as recited in claim 8 wherein said plurality of sensors includes at least one humidity level sensor.

13. The embroidery production monitoring system as recited in claim 8 wherein said plurality of performance measurements includes interruptions by frequency, time per interruption occurrence, total number of interruptions, machine operator identification, machine identification, shift identification, and atmospheric conditions.

14. The embroidery production monitoring system as recited in claim 8 wherein said light component is a light emitting diode.

\* \* \* \* \*